United States Patent [19]
Griffin et al.

[11] Patent Number: 5,446,679
[45] Date of Patent: Aug. 29, 1995

[54] METHOD FOR AN OPERATOR STATION TO PERFORM REQUESTED FUNCTIONS WHEN A FUNCTIONS PROCESSOR IS UNABLE

[75] Inventors: Chris M. Griffin, Westmont; Arthur L. Fumarolo, Schaumburg; Timothy L. McVey, Fox River Grove; Kenneth G. Sommer, Bartlett, all of Ill.

[73] Assignee: Motorola, Inc., Schaumburg, Ill.

[21] Appl. No.: 102,369

[22] Filed: Aug. 5, 1993

[51] Int. Cl.6 ............................................ H04Q 11/00
[52] U.S. Cl. ................................................ 364/514 C
[58] Field of Search .............. 364/514, 551.01, 187, 364/514 C; 371/8.1, 8.2; 370/16; 455/33.1, 33.2; 340/825.44

[56] References Cited

U.S. PATENT DOCUMENTS

| | | | |
|---|---|---|---|
| 3,636,331 | 1/1972 | Amroh | 364/187 |
| 4,878,051 | 10/1989 | Andros et al. | 340/825.44 |
| 4,991,204 | 2/1991 | Yamamoto et al. | 370/16 |
| 5,105,420 | 4/1992 | Ardon et al. | 370/16 |
| 5,115,425 | 5/1992 | Ardon | 370/16 |
| 5,295,133 | 3/1994 | Jurkgvich | 371/8.2 |
| 5,345,438 | 9/1994 | Otaki | 371/8.1 |

Primary Examiner—Ellis B. Ramirez
Attorney, Agent, or Firm—Timothy W. Markison

[57] ABSTRACT

In a communication system (100) that includes an operator station (105-107), a functions processor (104) and peripheral communication devices (108-109), the operator station (105-107) may perform functions when the functions processor (104) is unable in the following manner. When the operator station (105-107) receives a request for a particular function from an operator, it determines whether the functions processor (104) is unable to perform the requested function. If the functions processor (104) is unable, the operator station (105-107) determines whether it will perform the requested function or whether a peripheral communication device (108-109) will perform the requested function. If the operator station (105-107) is to perform the requested function, it performs the requested function. If the peripheral communication device (108-109) is to perform the requested function, the operator station (105-107) transports the requested function to the peripheral communication unit (108-109).

8 Claims, 2 Drawing Sheets

METHOD FOR AN OPERATOR STATION TO PERFORM REQUESTED FUNCTIONS WHEN A FUNCTIONS PROCESSOR IS UNABLE

FIELD OF THE INVENTION

This invention generally relates to communication systems and, in particular, to an operator station.

BACKGROUND OF THE INVENTION

The basic operation and structure of land mobile radio communication systems are known. Communication systems typically comprise a plurality of communication units (vehicle mounted or portable radios in a land mobile system and radio/telephones in a cellular system), a predetermined number of base stations, which are located throughout a geographic region and transceive information via communication resources or channels, consoles or operator stations, a resource allocator, a functions processor such as a computer aided dispatch computer (CAD), peripheral devices such as databases or modems, and a controlling entity. Operator stations provide access to the system for supervisors and dispatchers by allowing an operator to monitor the system and request specific functions. The CAD provides the dispatcher or supervisor with a computer interface and specialized software to carry out specific management and control functions.

Typically, the console and the CAD each communicate with the base stations via separate and distinct interfaces. In one system configuration, there is no interface between the console and the CAD. This system configuration is inefficient for the operator since it requires the operator to physically move from the console to the CAD when the operator desires to send a request that only the CAD can perform, such as sending a page; or physically move from the CAD to the console when the operator desires to send a request that only the console can perform, such as accessing a radio channel. This configuration also requires the operator to know multiple methods of sending requests, both via the CAD and via the console.

In another system configuration, an interface exists between the CAD and the console. In this configuration, the CAD contains intelligence to process all requests from the operator while the console only performs console services such as group dispatch, accessing a channel, etc. When the CAD receives a request from the operator, the CAD determines whether the CAD is to perform the request or whether a peripheral device is to perform the function. While this configuration only requires the operator to know one method of sending requests and does not require the operator to physically move back and forth between the console and the CAD, a backup mechanism is not provided to accommodate the system if the CAD becomes inoperable.

In system configurations comprising an interface between the CAD and the console, a mechanism for providing main/alternate routing may be implemented. In main/alternate routing, if a communication link fails between the CAD and a peripheral device, an alternate route is employed for communication. In this manner, the system continues to operate. However, if the communication link between the CAD and the console fails, main/alternate routing does not provide an alternate route for communication between the CAD and console. Thus, functions initiated through the CAD and intended for the console are not performed as requested.

Therefore, a need exists for a method that does not require the operator to know multiple procedures of sending requests, that does not require the operator to physically move back and forth between the CAD and the console, that provides a backup mechanism to keep the system operating if the CAD becomes inoperable, and that provides a mechanism to keep the system operating if the communication link between the CAD and the operator station fails.

DESCRIPTION OF A PREFERRED EMBODIMENT

Generally, the present invention provides a method for an operator station to perform functions when a functions processor is inoperable or overloaded. This is accomplished by having the operator station determine that the functions processor is unable to perform its duties. The operator station then determines an alternate set of functions to perform, using other available devices not including the functions processor. The altenate functions may be performed by the operator station or a peripheral communication device which the operator station has access to. The alternate functions performed may emulate the original function to be performed by the functions processor or may be completely different. The messages sent between devices in the system is also likely to be different, depending on whether the functions processor or operator station has control of the function being performed. Thus, the operator has the flexibility to enable the operator station to perform functions when the functions processor is unable, without the burdens of prior art systems.

Figure 1:
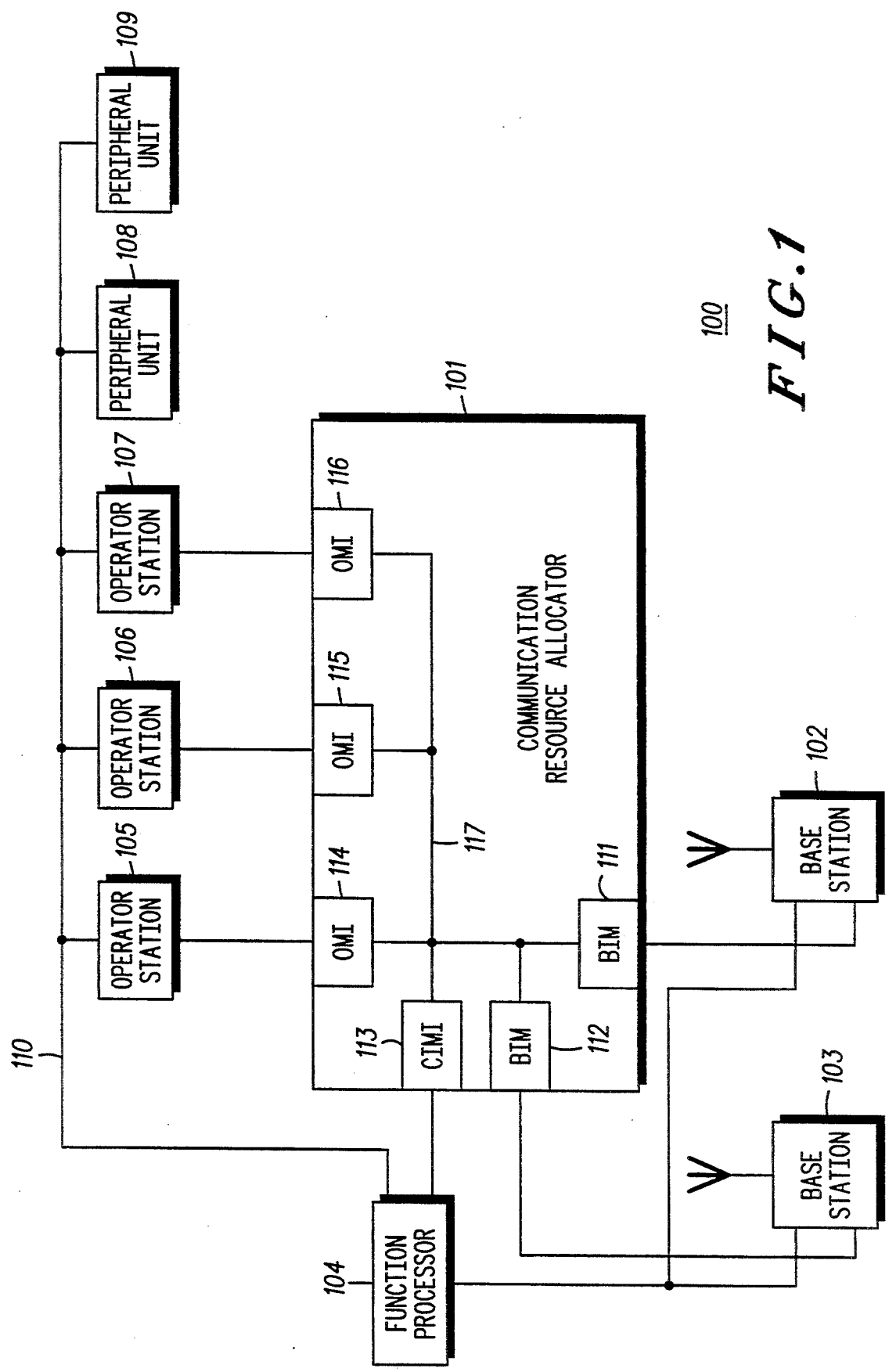
FIG. 1 illustrates a communication system in accordance with the present invention.

The present invention can be more fully described with reference to FIGS. 1 and 2. FIG. 1 illustrates a communication system (100) that comprises a communication resource allocator (101), base stations (102-103), a functions processor (104), operator stations (105-107), peripheral communication devices (108-109), a local area network (LAN) (110), Base Interface Modules (BIM) (111-112), a Computer Interface Multiplexer Interface (CIMI) (113), Operator Multiplexer Interfaces (OMI) (114-116) and a Time Division Multiplexed Bus (117). The communication resource allocator (101) allocates resources (or channels) for communication purposes, which involves assigning a logical data path for transmission of data and voice communications by communication units or the operator stations. The communication resource allocator (101) may be a Central Electronics Banks as manufactured by Motorola, Inc. The base stations (102-103) provide the conversion of data or voice received/transmitted to/from the BIMs (111-112) into radio frequency (RF) transmitted or received communications to/from the communication units. For purposes of this discussion, the base stations (102-103) are considered peripheral communication devices and may be an MSF5000 base station as manufactured by Motorola, Inc.

The functionality of the other elements in the communication system (100) are briefly described as follows. The functions processor (104) controls and performs functions based upon inputs from the operator stations (105-107) and other components of the system. In the communication system (100), the functions processor (104) may be a Computer Aided Dispatch (CAD) host computer. The operator stations (105-107) receive inputs and deliver responses to an operator (user) and may be a Centracom CRT Console as manufactured by Motorola, Inc. The peripheral communication devices (108-109) provide other functionality and interconnections. Examples of peripheral communication devices (108-109) are modems or an external database. The LAN (110), which may be an Ethernet, provides interconnection among certain components of the system. The Base Interface Modules (BIM) (111-112) provide an interface between the base stations (102-103) and the Time Division Multiplexed bus (117). The BIM (111-112) may be a Centracom BIM as manufactured by Motorola, Inc. The Computer Interface Multiplexer Interface (CIMI) (113) provides an interface between the functions processor (104) and the Time Division Multiplexed bus (117). The CIMI may be a Centracom CIMI as manufactured by Motorola, Inc. The Operator Multiplexer Interfaces (OMI) (114-116) provide an interface between the operator stations (105-107) and the Time Division Multiplexed (TDM) bus (117). The OMI may be a Centracom OMI as manufactured by Motorola, Inc. The TDM bus (117) provides an interconnection highway for modules that comprise the communications resource allocator (101). The Centracom back-plane, as manufactured by Motorola, Inc., is an example of a TDM bus.

As an example of normal operation of the present invention, consider a paging application in which the operator stations (105-107) each have a number of Pre-Programmed Page (PPP) switches. These buttons are programmed with channel, page type, page code and frequency of the page to be sent and eliminates the need to enter all of the information required for a page each time it is sent. To send a page using a PPP, the operator presses the PPP button and then presses a Send Page button. The operator station (105-107) sends a message to the functions processor (104) indicating the buttons pressed. The functions processor (104) deciphers the message and requests a channel from the communication resource allocator (101). The communication resource allocator (101) assigns a channel for the communication. The functions processor (104) then sends a page (message) via the base station (102-103) to the desired communication units (not shown).

When a connection between the operator station (105-107) and the functions processor (104) is lost, the operator station (105-107) can not send a message to the functions processor (104) to perform the function. This connection may be lost due to a malfunction in the CIMI interface (113), a malfunction in the functions processor (104) or a physical break in the communication line (110). If the operator presses the PPP button and then presses a Send Page button while the connection is lost, the operator station (105-107) recognizes that the functions processor is inoperable and the operator station performs the page function by requesting a channel from the communication resource allocator (101). After the communication resource allocator (101) grants a channel for the communication, the operator station (105-107) sends the page (message) via the base station (102-103).

Figure 2:
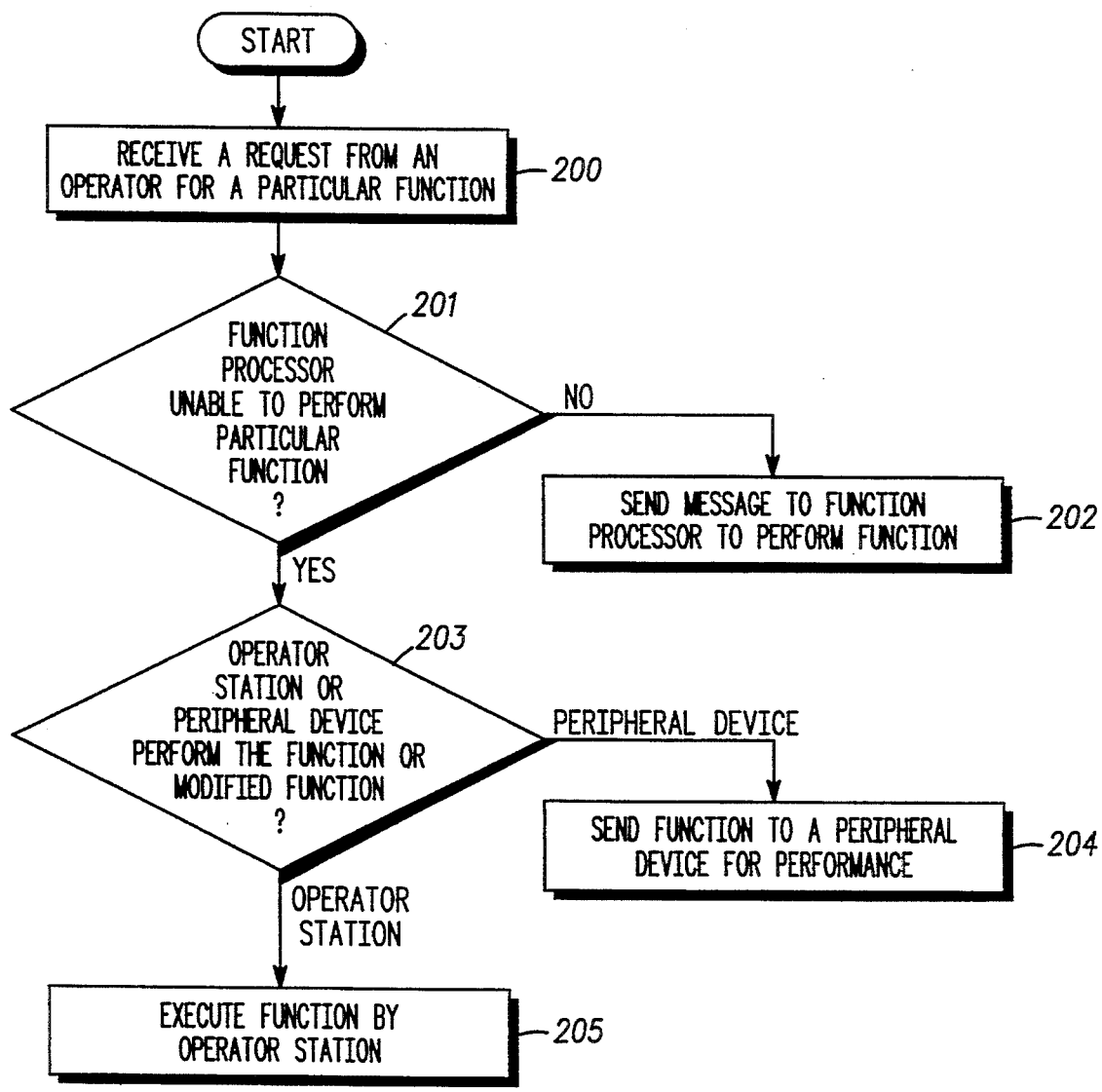
FIG. 2 illustrates a logic diagram that an operator station may use to implement the present invention.

For a further discussion on how the operator station performs when the functions processor is unable, consider the logic diagram of FIG. 2. In FIG. 2, the process begins at step 200 when the operator station receives a function request from the user. The user requests a particular function to be performed by pressing a corresponding function button on the operator station. Examples of function buttons, how the buttons operate, and how to utilize them is well known in the art as described in the Centracom Series II Operators manual by Motorola, Inc. When the user presses a function button, the operator station determines if the functions processor is able or unable to perform the requested function within a predetermined period of time (201). There are several methods that could be used to determine whether the functions processor is able to perform functions.

One method requires the functions processor to periodically send a status update message to the operator station; for example the status update message may be sent every 4 seconds. If 10 seconds elapses without receiving the status update, the operator station determines that the functions processor is unable to perform functions. Another method requires the operator station to send a function request to the functions processor and wait for an acknowledgment message indicating that the requested function has been performed. If the acknowledgment message is not received within a predetermined time period, the operator station determines that the functions processor is unable to perform the function. Still another method requires the function processor to send a message to the operator station indicating that it is unable to perform functions within the predetermined period of time. In this method, the operator station determines that the functions processor is unable to perform functions until another message is received indicating that the functions processor is able to perform functions. Yet another method has the operator of the operator station indicating that the functions processor is unable to perform the requested function by selecting a manual override which sends a manual override indication to the operator station. In this method, the operator station determines that the functions processor is unable to perform requested functions until the manual override indication is removed by the operator.

Regardless of the method used to determine that the functions processor is unable to perform, once it is determined (201), the operator station determines whether a peripheral communication device is to perform the requested function or whether the operator station is to perform the requested function (203). The type of function requested determines whether the peripheral communication device performs the function or if it is performed directly by the operator station. For example, a page requiring DTMF signalling would be performed by the operator station, whereas a page requiring 1200 bps would be performed by a peripheral communication device.

When the peripheral communication device is selected to perform the function, the operator station transports a message indicating the requested function to the peripheral communication device via the LAN (204). The peripheral communication device receives the message, decodes it, and executes all necessary steps to perform the requested function.

When the operator station is to perform the requested function, it may execute the same function, a modified function, or do nothing at all (205). This selection is based on the type of function requested by the user.

When the operator station is to perform the function, it creates operational instructions, required data packets, and sequence to perform the function directly. In this case, the operator station executes the operational instructions needed to perform the function. Continuing with the above paging example, the operator station sends the required data packets directly to the base station via the TDM bus and the BIM. The operator station also keeps track of the progress and status of the requested function and reports results and errors that may occur during execution of the requested function.

If the functions processor is able to perform the requested function within the predetermined period of time (201), the operator station sends the function request to the functions processor (202). The operator station sends the function request to the CIMI via the TDM bus. The CIMI converts the function request to a data packet as described in the Motorola CAD Interface specification and sends the data packet to the functions processor via the LAN. The functions processor decodes the data packet and executes all necessary steps to perform the requested function.

The present invention provides a method for an operator station to perform functions when a functions processor is inoperable or overloaded. With such a method, several problems of the prior art are resolved. For instance, prior art operation of the communications system relied on the intelligence of the functions processor to perform a function. If the functions processor failed (or became overloaded), the user of the operator station needed to manually abort the attempted function, and decide whether any other means existed to perform some complementary or alternate function. With the present invention, both the functions processor and the operator station have the intelligence to carry out some set of functionality, not necessarily the same, which would produce the results desired by the user. Thus, the operator station has the ability to determine whether to use the functions processor to perform the requested function, perform some alternate functionality, or use a peripheral unit to perform the requested function.

We claim:

1. In a communication system that includes at least one operator station, a functions processor, and a plurality of peripheral communication devices, wherein the operator station conveys requests for functions to be performed to the functions processor such that the functions processor performs the functions requested, a method for the operator station to perform functions when the functions processor is unable to perform the functions requested within a predetermined period of time, the method comprises the steps of:
   a) receiving, at the operator station, at least one request for a particular function to produce at least one requested function;
   b) determining, by the operator station, whether the functions processor is able to perform the at least one requested function within the predetermined period of time;
   c) when it is determined that the functions processor is unable to perform the at least one requested function within the predetermined period of time, determining, by the operator station, which of the operator station and a peripheral communication device of the plurality of peripheral communication devices is to perform the at least one requested function;
   d) when it is determined that the operator station is to perform the at least one requested function, performing, by the operator station, the at least one requested function based on operational instructions, wherein the operational instructions indicate instructions needed to perform the at least one requested function; and
   e) when it is determined that the peripheral communication device is to perform the at least one requested function, transporting, by the operator station, the at least one requested function to the peripheral communication device.

2. The method of claim 1, wherein step (b) further comprises the step of determining that a communication link between the functions processor and the operator station is inoperable.

3. The method of claim 1, wherein step (b) further comprises the step of receiving, by an operator station, a message from the functions processor indicating that the functions processor is unable to perform the at least one requested function within the predetermined period of time.

4. The method of claim 1, wherein step (b) further comprises the step of receiving, from an operator of the operator station, a manual override indication, thereby indicating that the functions processor is not to perform the at least one requested function.

5. In a communication system that includes at least one operator station, a functions processor, and a plurality of peripheral communication devices, wherein the operator station conveys requests for functions to be performed to the functions processor such that the functions processor performs the functions requested, a method for the operator station to perform modified functions, which differ from the functions requested, when the functions processor is unable to perform the functions requested within a predetermined period of time, the method comprises the steps of:
   a) receiving, at the operator station, at least one request for a particular function to produce at least one requested function;
   b) determining, by the operator station, that the functions processor is unable to perform the at least one requested function within the predetermined period of time;
   c) when it is determined that the functions processor is unable to perform the at least one requested function within the predetermined period of time, determining, by the operator station, whether the operator station is to perform the modified function or whether a peripheral communication device of the plurality of peripheral communication devices is to perform the at least one requested function;
   d) when it is determined that the operator station is to perform the modified function, performing, by the operator station, the modified function based on operational instructions, wherein the operational instructions indicate instructions needed to perform the modified function; and
   e) when it is determined that the peripheral communication device is to perform the at least one requested function, transporting, by the operator station, the at least one requested function to the peripheral communication device.

6. The method of claim 5, wherein step (b) further comprises the step of determining that a communication link between the functions processor and the operator station is inoperable.

7. The method of claim 5, wherein step (b) further comprises the step of receiving, by the operator station, a message from the functions processor indicating that the functions processor is unable to perform the at least one requested function within the predetermined period of time.

8. The method of claim 5, wherein step (b) further comprises the step of receiving, from an operator of the operator station, a manual override indication wherein the manual override indication indicates that the functions processor is not to perform the at least one requested function.

* * * * *